United States Patent [19]

Gittleman

[11] 4,037,014

[45] July 19, 1977

[54] SEMICONDUCTOR ABSORBER FOR PHOTOTHERMAL CONVERTER

[75] Inventor: Jonathan Isaac Gittleman, Trenton, N.J.

[73] Assignee: RCA Corporation, New York, N.Y.

[21] Appl. No.: 624,394

[22] Filed: Oct. 21, 1975

[51] Int. Cl.² .......................... F24J 3/02; F03G 7/02; B32B 15/16
[52] U.S. Cl. ........................... 428/331; 126/270; 126/271; 428/323; 428/404; 428/446; 428/469; 428/471; 428/539; 428/913
[58] Field of Search ............... 428/323, 331, 404, 539, 428/913, 446, 469, 471; 126/270, 271

[56] References Cited

U.S. PATENT DOCUMENTS

| | | | |
|---|---|---|---|
| 3,000,375 | 9/1961 | Golay | 126/270 |
| 3,013,897 | 12/1961 | Cupery et al. | 428/331 X |
| 3,176,678 | 4/1965 | Langley | 126/270 |
| 3,198,653 | 8/1965 | Hall | 428/469 X |
| 3,272,986 | 9/1966 | Schmidt | 126/270 |
| 3,914,516 | 10/1975 | Ritter | 428/539 X |
| 3,968,786 | 7/1976 | Spielberg | 126/270 |
| 3,978,272 | 8/1976 | Donley | 126/271 X |
| 3,981,293 | 9/1976 | Gillery | 126/271 |
| 4,002,541 | 1/1977 | Streander | 428/331 X |

*Primary Examiner*—Harold Ansher
*Attorney, Agent, or Firm*—H. Christoffersen; B. E. Morris; D. N. Calder

[57] ABSTRACT

A layer of electrically insulating material is coated on a reflector. Granular semiconductor particles are uniformly dispersed in the layer of electrically insulating material. The combination forms an efficient absorber for high temperature photothermal conversion of solar energy.

7 Claims, 3 Drawing Figures

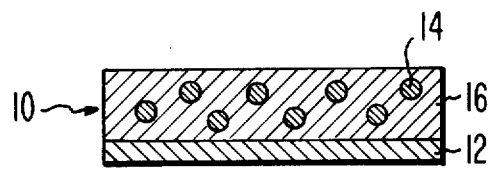
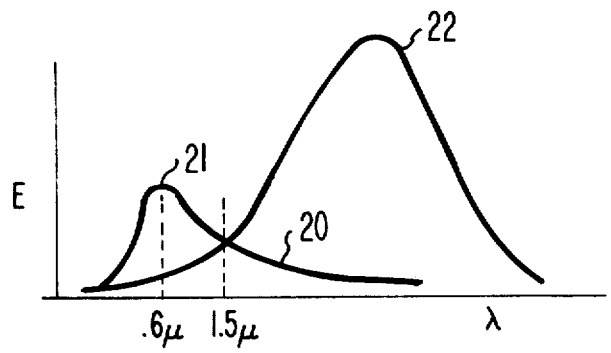
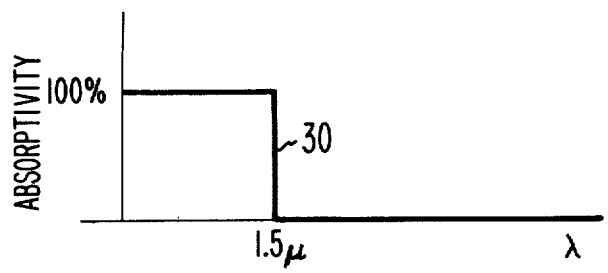

SEMICONDUCTOR ABSORBER FOR PHOTOTHERMAL CONVERTER

BACKGROUND OF THE INVENTION

The present invention relates to absorbers for photothermal conversion and more particularly to semiconductor absorbers for photothermal conversion.

Photothermal converters comprise absorbers which absorb sunlight and convert it into heat by raising the temperature of the absorber. Potential applications include conversion of sunlight into heat for generation of steam and electricity. Heretofore, absorbers were made from a material that was as little light-reflecting and as little transparent to light as possible, i.e. as dark as possible and preferably black. However, a dark body also radiates energy as a function of its temperature. In fact, the darker a body is, the more energy it radiates with increasing temperature of the body. Thus, for an absorber, there is an equilibrium temperature at which the total amount of energy absorbed equals the energy which is radiated. The absorber would then operate at this equilibrium temperature, since above this temperature the body would ratiate more energy than is absorbed. For most dark bodies, the equilibrium temperature is fairly low. However, to be useful and economical for generation of steam and electricity, the absorber must operate at a relatively high temperature, for example, at about 750°K.

U.S. Pat. No. 3,000,375 discloses a homogeneous semiconductor absorber which is intended to raise the equilibrium temperature. The absorber comprises a homogeneous layer of semiconductor, such as tellurium, silicon or germanium, on a reflector. Tellurium suffers from the drawback of cost, while homogeneous silicon suffers from the drawback of reflecting too much of the incident solar radiation. Homogeneous germanium suffers from having a low bandgap thereby preventing operation of temperatures suitable for economical generation of steam for electricity.

SUMMARY OF THE INVENTION

An absorber for photothermal conversion comprises a layer of electrically insulating material applied on a reflector. Granular semiconductor particles are uniformly dispersed in the layer.

BRIEF DESCRIPTION OF THE DRAWINGS

FIG. 1 is a cross-sectional view of an absorber of the present invention.

FIG. 2 is a graph of solar radiation spectrum and black body at 750°K radiation spectrum.

FIG. 3 is a graph of absorptivity of an ideal absorber.

DETAILED DESCRIPTION OF THE DRAWINGS

Referring to FIG. 1 there is shown a cross-sectional view of an absorber of the present invention, generally designated as 10. The absorber 10 comprises a layer 16 of an electrically insulating material having granular semiconductor particles 14 uniformly dispersed therein. The layer 16 is on a reflector 12.

The reflector 12 must be a good reflector of radiation in the infrared region and can be made, for example, from silver or aluminum. The layer 16 of electrically insulating material can be MgO, CaF$_2$, BeO, BaF$_2$, KBr, KCL, NaCl or any other electrically insulating material which does not absorb radiation in the infrared region, up to about 30 $\mu$. The layer 16 should also have an index of refraction lower than the granular semiconductor particles 14 over the entire wavelength range of interest, i.e. from about 0.3$\mu$ to about 30$\mu$. The granular semiconductor particles 14 are about 20-200A in size. The particles 14 are immiscible with respect to the layer 16 of electrically insulating material. The particles 14 can be made, for example, from silicon, germanium or alloys thereof, having an energy bandgap between about 0.7ev and about 1.2ev. The absorber 10 can be made by co-sputtering electrically insulating material of the layer 16 and semiconductor material of the granular semiconductor particles 14 on the reflector 12. The co-sputtering technique is well known in the art and has been used to form a wide variety of materials (see e. g. U.S. Pat. No. 3,843,420).

As will be shown the amount and type of granular semiconductor particles 14 will vary with the operating temperature. For operation at about 750°K, the absorber 10 should comprise by volume between about 10 to 50% granular semiconductor particles 14 uniformly dispersed in the layer 16 of MgO, CaF$_2$, BeO, BaF$_2$, KBr, KCl or NaCl on a reflector 12 of silver or aluminum.

As indicated earlier, the absorber 10 of the present invention is used in photothermal conversion, i.e. the conversion of solar radiation into heat. Among the applications of this conversion process is included the heating of water to form steam to generate electricity. The theory of operation of a semiconductor absorber can best be understood by referring to FIGS. 2 and 3.

FIG. 2 is a graph of energy (E) v. wavelength ($\lambda$). The solar spectrum is shown as curve 20. The solar spectrum 20 has a peak at 21, near the middle of the visible range, around 0.55$\mu$. The curve 22 is the emission spectrum of a black body operating at about 750°K. From the curve, it is clear that no black body operating at 750°K can act as an efficient photothermal converter; the total amount of energy emitted by a black body at 750°K (area under curve 22) exceeds the total amount of available solar energy (area under curve 20). Thus, the black body would lose heat be emission, lowering the temperature of its operation until the equilibrium temperature, at which total energy absorbed equals total energy emitted, is reached. Since the emissivity of a black body is proportional to its absorptivity, the emission spectrum curve 22 also represents the absorption spectrum of the black body.

The absorption spectrum curve of an ideal absorber operating at 750°K is shown in FIG,. 3. 750°K is chosen because it is a typical value for steam power plants. The absorption spectrum curve 30 of an ideal absorber is a plot of wavelength ($\lambda$) v. absorptivity (% of absorption). For operationn at about 750°K, the critical wavelength is calculated to be about 1.5 $\mu$, i.e. the ideal absorber should absorb 100% of all the radiation in the 0-1.5 $\mu$ range and should absorb 0% of all the radiation from 1.5 $\mu$ and higher. Since the ideal absorber would absorb no radiation in the range 1.5 $\mu$ and up, it would emit no radiation in that range. In the range of 0-1.5 $\mu$ the ideal absorber would absorb all the solar radiation; however its emission spectrum in the range 0-1.5 $\mu$ is limited to that portion of the black body emission curve 22 of FIG. 2 in the range 0-1.5 $\mu$. This is because the black body emission curve 22 is the maximum energy emission curve for any body operating at 750°K. Referring to FIG. 2, it is clear that in the range 0-1.5 $\mu$, there is more solar energy (area under curve 20, between 0-1.5 $\mu$) available for conversion, than energy lost by maximum emission (area under curve 22, between 0–1.5 μ). In short, by limiting the emission and absorption spectrum to the range 0–1.5 μ, there is potential for net energy gain.

To implement the ideal absorber, it has been suggested to place a homogeneous layer of semiconductor, such as tellurium on a reflecting surface (see U.S. Pat. No. 3,000,375). The theory is that since semiconductors have energy bandgaps, there is a corresponding wavelength above which the semiconductor is transparent. Above this wavelength, i.e. in the infrared region, the incident radiation would penetrate the semiconductor and be reflected by the reflecting surface. Thus the reflector must be a good reflector of radiation in the infrared region. Below this wavelength all or most of the incident radiation should be absorbed by the semiconductor. For silicon, which is more economical than tellurium, the wavelength which corresponds to its energy bandgap is approximately 1.0 μ, i.e. the semiconductor is transparent to radiation above this wavelength. However, since silicon has a large index of refraction, below this wavelength, it laser much of the radiation by reflection.

The absorber of the present invention can overcome this problem. By uniformly dispersing granular silicon particles 14 in the layer 16, which has an index of refraction lower than the silicon particles 14, the resultant absorber 10 will have an index of refraction lower than the absorber of the prior art having a homogeneous layer of silicon material. Thus, the absorber 10 will absorb more of the radiation in the range 0–1.0 μ. To prevent absorption of radiation in the infrared region, i.e. above 1.0 μ, the layer 16 must be of a material which does not absorb radiation in that region. Radiation in the infrared region would penetrate the layer 16 and the semiconductor particles 14 and be reflected by the reflector 12. The alloying of germanium, which has a narrower bandgap than silicon, with silicon to form the granular semiconductor particles 14 in the layer 16 of electrically insulating material would enhance absorption of solar radiation in the region 0–1.5 μ. In order for the granular semiconductor particles 14 to retain their granular nature and thus for the absorber of the present invention to work, the layer 16 in which the semiconductor particles 14 are dispersed must be immiscible with respect to the semiconductor particles 14.

Compared to the homogeneous semiconductor absorber, as disclosed in U.S. Pat. No. 3,000,375, the absorber 10 of the present invention also offers flexibility in designing an absorber to operate at any temperature. Once the desired operating temperature is determined, the critical wavelength for operation of the absorber can be calculated. The amount and type of granular semiconductor particles to be used to operate the absorber at the critical wavelength can then be calculated.

What is claimed is:

1. An absorber for photothermal conversion comprising:
    a reflector;
    a layer of electrically insulating material on said reflector;
    granular semiconductor particles uniformly dispersed in said layer;
    said electrically insulating layer having an index of refraction lower than said semiconductor particles and exhibiting no significant absorption in the infrared radiation region up to about 30 μ; and
    said layer also being immiscible with said semiconductor particles.

2. An absorber in accordance with claim 1, wherein said reflector is a highly reflecting metal.

3. An absorber in accordance with claim 2, wherein said metal is a material selected from the group consisting of silver and aluminum.

4. An absorber in accordance with claim 1, wherein said semiconductor particles bane an energy gap between about 0.7 ev. and about 1.2 ev.

5. An absorber in accordance with claim 4 wherein said semiconductor particles are a material selected from the group consisting of silicon, germanium, and alloys thereof.

6. An absorber in accordance with claim 1, wherein said electrically insulating layer is a material selected from the group consisting of $CaF_2$, BeO, $BaF_2$, KBr, KCl, and NaCl.

7. An absorber in accordance with claim 6 for operating at a temperature about 750°K comprising
    10 to 50% by volume of said semiconductor particles dispersed in said electrically insulating layer.

* * * * *